(12) United States Patent
Kaiser

(10) Patent No.: US 7,060,314 B2
(45) Date of Patent: Jun. 13, 2006

(54) METHOD OF AND APPARATUS FOR PRODUCING ENDLESS ROLLS OF A RESILIENT FOODSTUFF

(75) Inventor: Anno Kaiser, Glonn (DE)

(73) Assignee: Kraft Foods R & D, Inc. (DE)

( * ) Notice: Subject to any disclaimer, the term of this patent is extended or adjusted under 35 U.S.C. 154(b) by 286 days.

(21) Appl. No.: 10/125,743

(22) Filed: Apr. 17, 2002

(65) Prior Publication Data
US 2002/0187236 A1 Dec. 12, 2002

(30) Foreign Application Priority Data
Apr. 27, 2001 (EP) .................................. 01110056

(51) Int. Cl.
*A21C 3/06* (2006.01)
(52) U.S. Cl. ..................... 426/501; 426/517; 425/322; 425/334; 425/305.1; 425/374
(58) Field of Classification Search ................ 426/500, 426/501, 512, 517; 425/334, 322, 305.1, 425/374
See application file for complete search history.

(56) References Cited

U.S. PATENT DOCUMENTS

| | | | | |
|---|---|---|---|---|
| 1,179,294 | A | * | 4/1916 | E mbrey ........................ 426/27 |
| 1,805,706 | A | * | 5/1931 | Gottfried ..................... 425/321 |
| 2,337,539 | A | | 12/1943 | Buechek |
| 2,354,681 | A | | 8/1944 | Grimm et al. |
| 2,674,209 | A | | 4/1954 | Anetsberger et al. |
| 2,983,614 | A | | 5/1961 | Hensgen et al. |
| 3,225,717 | A | * | 12/1965 | Page ........................... 426/501 |
| 4,299,855 | A | | 11/1981 | Wada et al. |
| 4,313,719 | A | * | 2/1982 | Lundgren ..................... 425/335 |
| 4,496,593 | A | | 1/1985 | Caille |
| 4,761,293 | A | * | 8/1988 | Herting ........................ 426/383 |
| 4,842,879 | A | * | 6/1989 | Ek ............................... 426/297 |
| 5,191,832 | A | | 3/1993 | Tsay |

(Continued)

FOREIGN PATENT DOCUMENTS

EP 0272341 6/1988

(Continued)

OTHER PUBLICATIONS

European Search Report, mailed Nov. 22, 2001, 7 pages(EP 01 11 0056).

*Primary Examiner*—Drew Becker
(74) *Attorney, Agent, or Firm*—Fitch, Even, Tabin & Flannery

(57) ABSTRACT

A method of and an apparatus for producing endless rolls of a resilient foodstuff, as well as a product in the form of a roll of hard cheese is provided. The method comprises supplying a layer (7) of the resilient foodstuff in a supply plane and against a first guide roller (20, 120), continuously deflecting the resilient foodstuff layer (7) by way of the first guide roller (20, 120) away from the supply plane, and continuously re-directing the deflected foodstuff layer (7) by way of a second guide roller (30, 130) toward the supply plane, so as to produce a roll of foodstuff; the apparatus comprises a supply mechanism (5) for supplying a layer (7) of the resilient foodstuff in a supply plane, a first guide roller (20, 120) against which the resilient foodstuff layer (7) can be supplied and for continuously deflecting the foodstuff layer away from the supply plane, and a second guide roller (30, 130) for continuously redirecting the deflected foodstuff layer (7) toward the supply plane.

31 Claims, 6 Drawing Sheets

U.S. PATENT DOCUMENTS 6,165,522 A    12/2000    Lira

FOREIGN PATENT DOCUMENTS

| EP | 0611029  | 8/1994 |
| EP | 0858738  | 8/1998 |
| EP | 1135985  | 9/2001 |
| FR | 2342030  | 9/1977 |
| GB | 2197615  | 5/1988 |
| JP | 62138156 | 6/1987 |

* cited by examiner

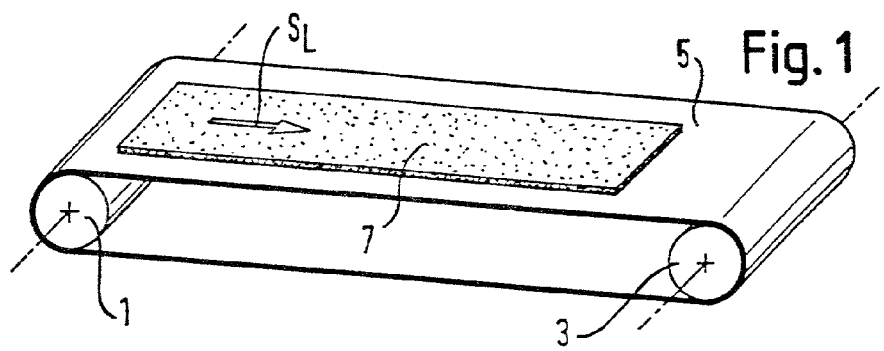
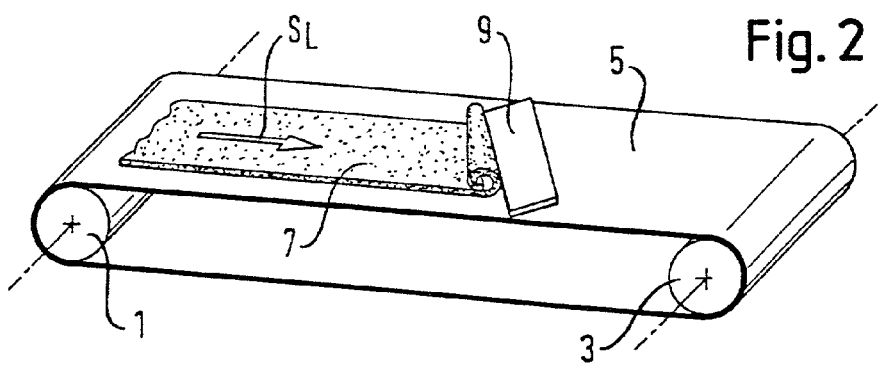
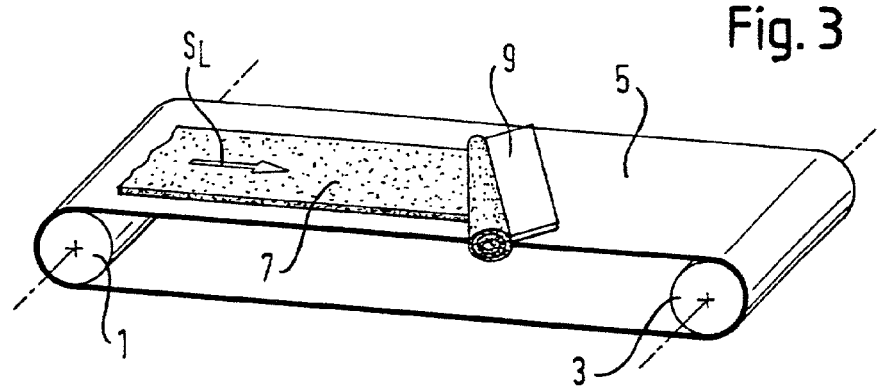
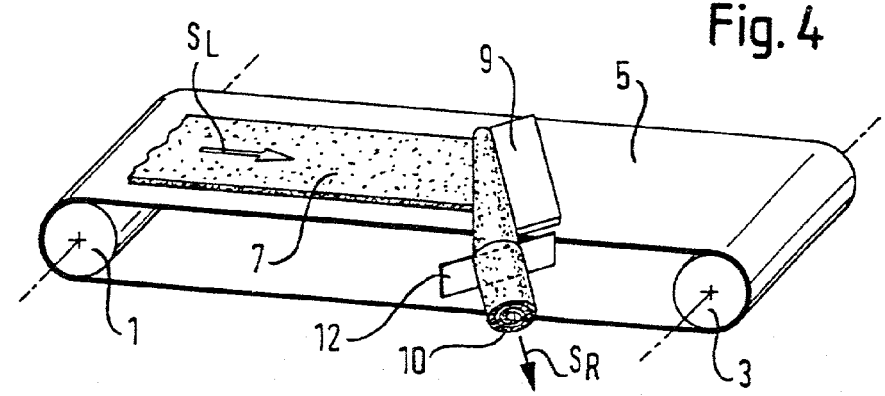

METHOD OF AND APPARATUS FOR PRODUCING ENDLESS ROLLS OF A RESILIENT FOODSTUFF

TECHNICAL FIELD

The present invention relates to the processing of foodstuff strips, in particular a continuous layer of natural or process cheese into an endless cheese roll. In accordance with the invention, a method of producing rolls of a resilient foodstuff, an apparatus therefor, and a novel product in the form of a roll of cheese are provided.

BACKGROUND ART

From another technological field, methods and apparatus for processing dough and the like are known.

For instance, Machinefabrik M. A. Rademaker B. V., P.O. Box 416 NL-4100 Culemborg offer an apparatus for producing filled rolls of pastry. The fillings can be rolled into sheets of dough by means of motorized cone-shaped rollers.

Further, Rheon Automatic Machinery GmbH, Tiefenbroicher Weg 30, D-40472 Düsseldorf also offer an apparatus for producing filled rolls of pastry. The apparatus comprises a conveyor belt for supplying sheets of dough to a cylindrical roller. The cylindrical roller is arranged in parallel to the plane of the dough sheets and with its axis in an angle relative to the supply direction.

However, experiments have proven this machinery to be ineffective for treating natural and/or process cheese. It is believed that this can be attributed to the different materials properties of cheese. For example, dough exhibits relatively low elasticity, whereas natural and/or process cheese is more resilient and, therefore, has fairly high restoring forces, tending to restore the original shape of the cheese.

Further art is known from for example WO 97/33822 (Farley Candy Company, Inc.) which discloses a winding assembly and a rolled food product. The apparatus disclosed in WO 97/33822, however, is limited in that the maximum diameter of the produced roll is largely determined by the spacing between the disclosed product feed guide and a roll-up device, both of these elements being fixed. The products mentioned as illustrative applications for the disclosed apparatus are pastries,. cookies, candies, chips, pizza, egg rolls, burritos, enchiladas, ravioli, manicotti, egg and cabbage rolls, blintzes and cannelloni, as well as gum and candy, i.e. all foodstuff with low resiliency while being processed.

Further, an apparatus relying on the suction force of a vacuum applied to a continuously moving sheet material, and on the pressure exerted by the application of compressed air is known from EP 0 739 586 A1 (Societé des Produits Nestlé S. A.) . The vacuum and the compressed air are applied through an elongated straight pipe. The longitudinal axis of the pipe is arranged perpendicular to the supply direction and parallel to the plane of the supplied sheet material. The pipe can be moved in a direction perpendicular to the plane of the supplied material. The range of movement in this direction is limited. Therefore, the apparatus disclosed in EP 0 739 586 A1 is not capable of continuously producing an endless roll from sheet material. Again, the prior art apparatus is destined for dough, sliced meat, pasta, etc., i.e. soft materials.

SUMMARY OF THE INVENTION

It is the underlying technical problem of the present invention to develop a new, marketable foodstuff product.

This problem is solved by a method comprising the features recited in claim 1, by an apparatus comprising the features of claim 14, and by a product comprising the features of claim 29. Advantageous further embodiments are defined in the dependent claims, respectively.

In accordance with the invention the method comprises supplying a layer of the resilient foodstuff in a supply plane and against first guide means. The layer of the resilient foodstuff can be an endless strip of material, or individual elongated strips of material may successively be supplied. Supplying takes place against a first guide means, so that physical contact between the layer of resilient foodstuff and the first guide means is established. If the supplied layer is a strip, this physical contact may take place between only a portion of the strip as seen in the directions along and across the strip and the first guide means, over the entire width of the strip, or as otherwise appropriate. The inventive method further comprises continuously deflecting the resilient foodstuff layer away from the supply plane. In accordance with the invention, this continuous deflection is carried out by the first guide means. For a continuous deflection, continuous contact between the layer and the first guide means is not necessarily required. Intermittent contact is also possible and may even be preferred. It is to be understood that continuously deflecting also embraces the continuous deflection with varying degree. The deflected foodstuff layer is in accordance with the invention continuously re-directed toward the supply plane. The continuous re-direction is carried out by way of second guide means. The step of re-directing advantageously ensures that the foodstuff layer, once deflected, will not spring back so as to assume its original shape and orientation. Instead, the deflected foodstuff layer is re-directed toward the supply plane, which is desired so as to produce a rolled foodstuff. The roll-in may be achieved by contacting the re-directed foodstuff layer and entraining same by means of at least a portion of the foodstuff layer freshly supplied. Alternatively or additionally, further guide means may be provided. Producing a roll of foodstuff by providing a step of continuous deflecting and a further step of continuous re-directing advantageously renders even the stress and strain the foodstuff layer undergoes. Thus, product breakage is avoided and a stable continuous process is achieved.

It is a preferred method if the step of supplying is carried out in the supply plane along a supply direction, and the step of deflecting is carried out in an angle relative to the supply direction. Due to the angle relative to the supply direction, the diameter of the produced roll of foodstuff increases from the vertex of the angle to the open side, so that a continuously increased rolling is obtained and breakage of the product is even less likely.

By modifying the angle relative to the supply direction, the diameter of the produced roll of foodstuff can be controlled in accordance with a preferred embodiment of the inventive method. An angle of 90° indicates that the axis of the produced roll of foodstuff is perpendicular to the supply direction of the layer of foodstuff. An angle of 0° indicates that this axis is parallel to the supply direction. Between 0° and 90° the axis of the produced roll of foodstuff will additionally be nonparallel to the supply plane. Due to the angle relative to the supply direction, the produced roll of foodstuff gradually increases in its diameter until the desired diameter is reached in accordance with the preselected angle.

It is preferred to control the diameter of the produced roll of foodstuff by modifying the angle relative to the supply direction. Angles of 0° and 90° yield the largest possible diameter, but render the continuous production of a roll difficult, if not impossible. Adjusting the angle is a simple and easy to handle control mechanism that can be used on-line.

It has been proven to yield the best results if this angle is between 30° and 60°, and preferably 45°. At substantially 45°, the produced rolls of foodstuff have optimum tightness, the diameter of the roll still being susceptible to modification by way of other mechanisms described further below.

The roll-in characteristics are improved for resilient foodstuff, and the tightness of the produced roll can be precisely controlled as desired if, as provided in a preferred embodiment of the present invention, the first guide means is driven such that its guiding effect is frictionally enhanced, and/or the second guidance means is driven such that its re-directing effect is frictionally enhanced.

Driving the first and the second guide means in opposite directions permits to further increase the tightness of the produced roll and facilitates overcoming the resiliency of the processed foodstuff.

A first specific embodiment of the invention provides as part of the first guide means a deflection roller having a line generating its enveloping surface which line is adjacent to and substantially parallel to the supply plane of the processed foodstuff. The roller can be cylindrical, but is preferably a cone-shaped deflection roller. In this manner, there is a line of contact between the deflection roller and the produced roll of contact that is parallel to the axis of the produced roll of contact. Consequently, the force that car be exerted by the deflection roller on the processed foodstuff is utilized the most.

It is further preferred that the second guide means is formed by preferably a pair of re-direction rollers that are typically cylindrical. Since one of the pair of re-direction rollers would then form a core shaft around which the produced roll of foodstuff is wound, providing a cylindrical roller offers the opportunity to wind the roll of foodstuff strictly concentrically. The inner diameter of the produced roll would then correspond to the chosen diameter of this one of the pair of re-direction rollers.

In an alternative embodiment of this present invention, as part of the first guide means at least one non-cylindrical deflection roller is provided, with its axis of rotation arranged substantially perpendicular to the supply plane. In this embodiment, part of the second guide means is also a non-cylindrical roller with its axis of rotation arranged substantially perpendicular to the supply plane. The second guide means may then be termed re-direction roller and its axis would be arranged substantially parallel to the axis of the deflection roller. This second alternative embodiment reduces the contact between first and second guide means and the processed foodstuff to a minimum, which can be desired depending on the properties of the processed materials.

If the cheese products according to the present invention, such as they are illustrated in FIGS. 13 to 15, are to be provided as snacks, their dimensions must be adjusted accordingly. That is to say, if the snack food product is to be provided in rolls of process cheese, each roll has between 3 and 65 windings, better between 6 and 32 windings, and preferably 8 windings. Its outer diameter may then vary from 3 to 20 cm, better from 4 to 10 cm, and is preferably 5.5 cm; its inner diameter from 0.5 to 5 cm, better from 0.5 to 3 cm, and is preferably 1.4 cm; the foodstuff layer may correspondingly vary in breadth from 0.5 to 10 cm, better from 0.7 to 5 cm, and is preferably 1 cm; in thickness, the layer may vary from 1 to 10 mm, better from 1.5 to 5 mm, and is preferably 2.1 mm. This corresponds to a processed length of the foodstuff layer for one roll between 30 and 2100 cm, better between 50 and 500 cm, and preferably 100 cm.

The cheese used for the cheese product according to the present invention is limited as to its type, in that it should be of sufficient strength and elasticity to be manually handled over the projected shelf life, preferably so that the individual windings are peelable from the rolled cheese product. These requirements were found to be met by hard-cheese type products and by process cheese. However, in a preferred embodiment, the cheese product according to the present invention consists of process cheese.

BRIEF DESCRIPTION OF THE DRAWINGS

The invention will in the following be further described by way of exemplary embodiments that are depicted in the Figures, in which:

FIGS. 1 to 4 show the general process of obtaining a roll of natural or process cheese from a supplied layer of endless strip cheese;

DETAILED DESCRIPTION OF THE PREFERRED EMBODIMENTS

Figure 5:
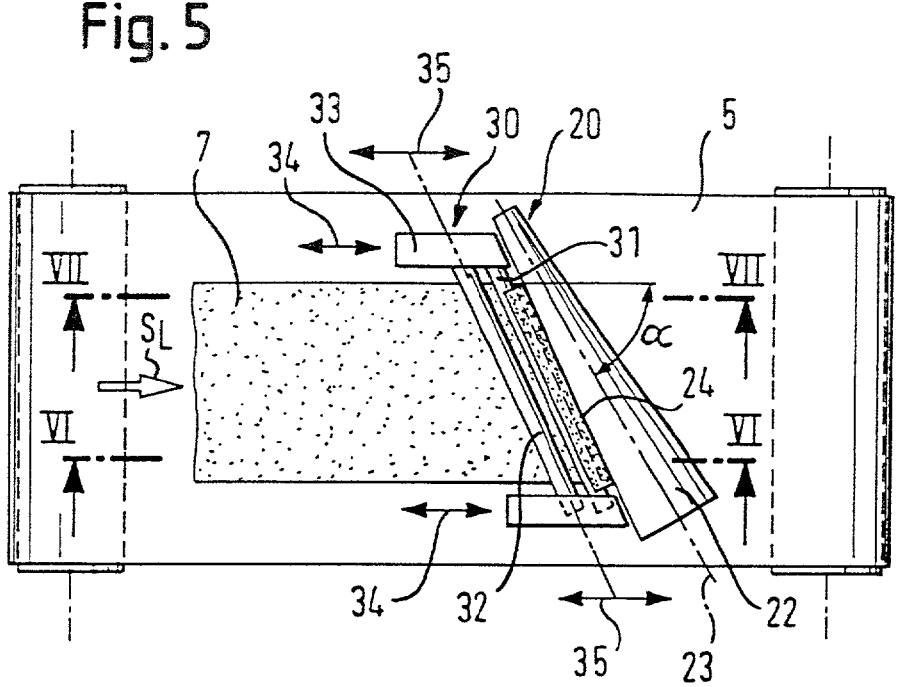
FIG. 5 shows a first embodiment of the present invention in a top view.

The underlying principle for manufacturing a roll of foodstuff from a supplied layer of strip cheese will be explained in the following with reference to FIGS. 1 to 4.

In FIG. 1, reference numeral 1 denotes a first conveyor belt roller, reference numeral 3 a second conveyor belt roller. In a conventional manner, an endless conveyor belt 5 extends around these two rollers and is driven, e.g. by at least one of the rollers. On the conveyor belt 5 a strip 7 of foodstuff is supplied along a supply direction $S_L$. The foodstuff apparatus and method of the present invention is most suitable for processing natural or process cheese or a mixture thereof.

In FIG. 2, a roll-in device 9 is additionally shown that is located substantially over the entire width of the conveyor belt 5. The supplied foodstuff strip 7 is being brought into contact with the roll-in device 9 resulting in a roll-in of the strip 7, such as it is depicted in FIG. 2. It will be noted from FIG. 2 that the roll-in device 9 is mounted in an angle relative to the longitudinal extent of the strip 7 of foodstuff. Accordingly, the initial roll-in of the strip 7 takes place around an axis that is also orientated in an angle relative to the supply direction. Initially, the angle of the foodstuff roll relative to the supply direction will be substantially identical to the angle of the roll-in device 9 relative to the supply direction $S_L$. However, as the roll increases in diameter, these two angles will deviate.

FIG. 3 shows how the diameter of the roll increases upon supplying further cheese material.

FIG. 4 shows clearly that once the produced roll 10 of foodstuff leaves the conveyor belt 5 in the supply direction of the roll $S_R$, its diameter will remain constant. A continuous supply of a strip 7 of foodstuff will, therefore, result in a continuous production of a roll 10 of the foodstuff. The supply direction changes from the supply direction of the layer $S_L$ to the supply direction of the roll $S_R$. Suitable parting means 12 such as rotating knife blades or the like may be provided adjacent to the conveyor belt and in an angle relative to the longitudinal extension of the latter. By parting the continuous foodstuff roll 10, individual articles may be produced.

FIG. 5 shows a top view of a first embodiment of the roll-in device 9, in which first guide means 20 and second guide means 30 are provided. In the described embodiment, the first guide means 20 essentially consists of a side winder roller 22 for deflecting the supplied foodstuff strip 7. As is evident from FIG. 5, the side winder roller 22 is of a truncated cone shape, and extends over substantially the entire width of the foodstuff strip 7.

The second guide means 30 comprises a core shaft 31 and a tightening shaft 32. Both shafts are mounted in a motor unit 33. The motor unit 33 as a whole can be displaced by means of a slide mechanism 34 along the supply direction $S_L$ of the foodstuff layer. Alternatively, it is also possible to provide the slide mechanism 34 so as to have the motor unit 33 be displaced perpendicular to the main axis 23 of the side winder roller 22. The slide mechanism 34 is provided to adapt the apparatus to variations in the quality (e.g. the thickness) of the provided foodstuff strip 7.

Figure 6:
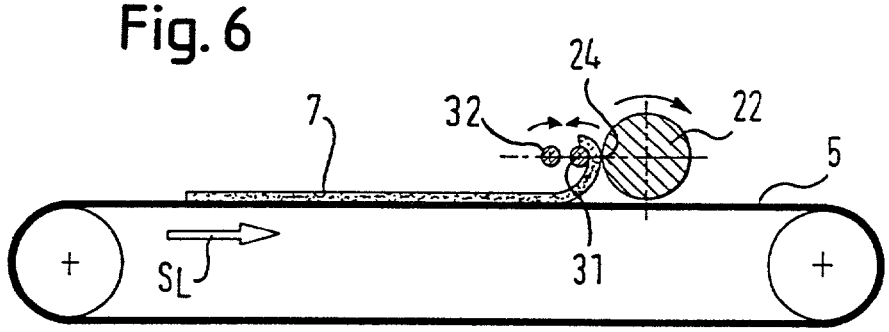
FIG. 6 shows a cross-sectional view along line VI—VI in FIG. 5.

Turning now to FIG. 6, it is to be noted that the side winder roller 22 is mounted close to the conveyor belt 5, with the gap between the line of surface of the side winder roller 22 closest to the conveyor belt 5 typically being smaller than the thickness of the foodstuff strip 7. The cone-shaped side winder roller 22 is mounted relative to the conveyor belt 5 so that the generating line for its enveloping surface adjacent to the conveyor belt 5 is parallel thereto. This can also be taken from a comparison of FIGS. 6 and 7, in which the gap between the side winder roller 22 and the conveyor belt 5 is shown to be identical. Additionally, the side winder roller 22 is mounted in an angle α relative to the supply direction $S_L$ of the foodstuff strip 7. The angle α will correspond to the angle between the supply directions $S_L$ and $S_R$ of the foodstuff strip 7 and the foodstuff roll 10, respectively, in that the generating line for the enveloping surface of the side winder roller 22 next to the foodstuff roll 10 will be parallel to the contacting line of the rolled up foodstuff strip. Therefore, the angle α between the axis of the side winder roller 22 and the supply direction $S_L$ of the foodstuff strip 7 will be larger than the angle between these supplied directions $S_L$ and $S_R$, by an amount corresponding to the angles of inclination of the cone shaped side winder roller 22 on the one hand, and the foodstuff roll 10 on the other hand.

Core shaft 31 of the second guide means 30 is a cylindrical roller and mounted so as to have its central axis in the same plane as the central axis 23 of the side winder roller 22; the central axis of the core shaft 31 will at all times coincide with the central axis of the roll of foodstuff being produced. As is evident from the Figures, core shaft 31 need not extend over the entire width of the supplied foodstuff strip 7. Rather, it only extends over a portion of that width, sufficiently far to guide between three and four windings of the evolving foodstuff roll 10. Naturally, the dimensions of the core shaft 31 and the gap account for the quality and the dimensions of the supplied foodstuff strip 7. In particular, it may be preferred to adjust the angle of the core shaft on-line so as to precisely match the desired weight of a packaging unit. Further, the gap between core shaft 31 and side winder roller 22 essentially corresponds to the thickness of the foodstuff strip 7.

Core shaft 31 is driven via a motor unit 33 (FIG. 5). The same or a separate motor unit can also drive tightening shaft 32 which is mounted adjacent and in the same plane as the core shaft 31 and the central axis 23 of the side winder roller 22. The side winder roller 22 is also driven, typically by means of a further motor unit (not shown). As will be appreciated from FIG. 6, the foodstuff strip 7 is supplied along the supply direction $S_L$, so that the conveyor belt 5 on that side also moves in the supply direction $S_L$.

The side winder roller 22 is driven so that its surface where it is adjacent to the conveyor belt 5 moves in the opposite direction. Core shaft 31 is driven so as to move in the opposite direction of the side winder roller 22. The tightening shaft 32 turns in the same direction as the side winder roller 22 and in the opposite direction as the core shaft 31 (compare the arrows in FIGS. 6 and 7).

Figure 7:
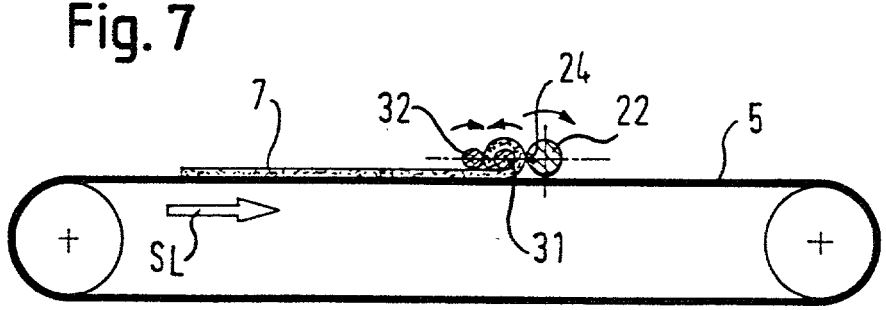
FIG. 7 shows a second cross-sectional view of the first embodiment along line VII—VII in FIG. 5.

Operation of the first guide means 20 and the second guide means 30 depicted in FIGS. 5 through 7 is as follows.

Once a fresh foodstuff strip 7 is placed onto the conveyor belt 5, it will be supplied along the supply direction $S_L$. Its leading edge will approach the side winder roller 22. Since the gap between the side winder roller and the conveyor belt 5 is smaller than the thickness of the foodstuff strip 7, the leading edge of the foodstuff strip 7 will contact the side winder roller 22. Since the side roller 22 rotates in a direction opposite to the linear movement of the conveyor belt 5, the leading edge of the foodstuff strip 7 will engage with the side winder roller 22 and be lifted. Thus, it will be deflected away from its supply plane.

However, the resiliency of the natural or process cheese will tend to restore the foodstuff strip 7 to its original shape. In other words, if no provision is taken, the foodstuff strip 7 will tend to follow the side winder roller 22 around its entire periphery.

In the present embodiment, upon approaching the core shaft 31, the leading edge of the foodstuff strip 7 will engage with the outer surface of the core shaft 31. Due to the opposite direction of rotation of the core shaft 31, the leading edge will follow the rotation of the core shaft and enter the gap between the core shaft 31 and the tightening shaft 32. In this manner, the foodstuff strip will be re-directed toward its original supply plane.

This effect can be enhanced by mounting the core shaft 31 so that it can be displaced and transform the gap between the core shaft 31 and the side winder roller 22 into a press nip.

Exerting pressure from the side of the core shaft 31 onto the foodstuff strip 7 will cause the foodstuff strip 7 to bend around the core shaft 31.

It is preferred that the tightening shaft 31 be driven and independently displaceably mounted, e.g. in a slide mechanism 35. It is to be noted that the slide mechanisms 34 and 35 are purely optional. Once the process has reached its stable operating conditions, the number of windings of the foodstuff roll 10 on the conveyor belt remains constant. Therefore, it is entirely sufficient to mount the side winder roller, the core shaft and the tightening shaft in an adjustable but otherwise fixed fashion. By modifying the angle α of the side winder roll 22, and preferably together with it the angle of the core shaft 31 and the tightening shaft 32, relative to the supply direction $S_L$, the diameter of the foodstuff roll 10 can be controlled. Such a modification can easily be obtained by appropriately mounting the elements involved on a pivot arm structure (not shown).

By controlling the individual velocities of the core shaft 31 and the tightening shaft 32, it is then possible to precisely determine how tightly the produced roll of foodstuff is rolled. If the rotational velocity of the tightening shaft 32 is higher than that of the core shaft 31, the produced roll will tend to be more tightly wound, if it is lower, it will tend to be loosely wound. Biasing the tightening shaft 32 against the core shaft 31 will assist to transmit frictional forces onto the foodstuff strip 7.

So as to facilitate the sliding of the produced roll of foodstuff along its supply direction $S_R$ (compare FIG. 4), the core shaft 31 and/or the side winder roller 22 can be provided with longitudinal or spiral grooves. Further, their surface may be adequately coated or treated.

At the start of production, it may be required to manually roll two to four windings of the cheese product to be treated around the core shaft.

Figure 8:
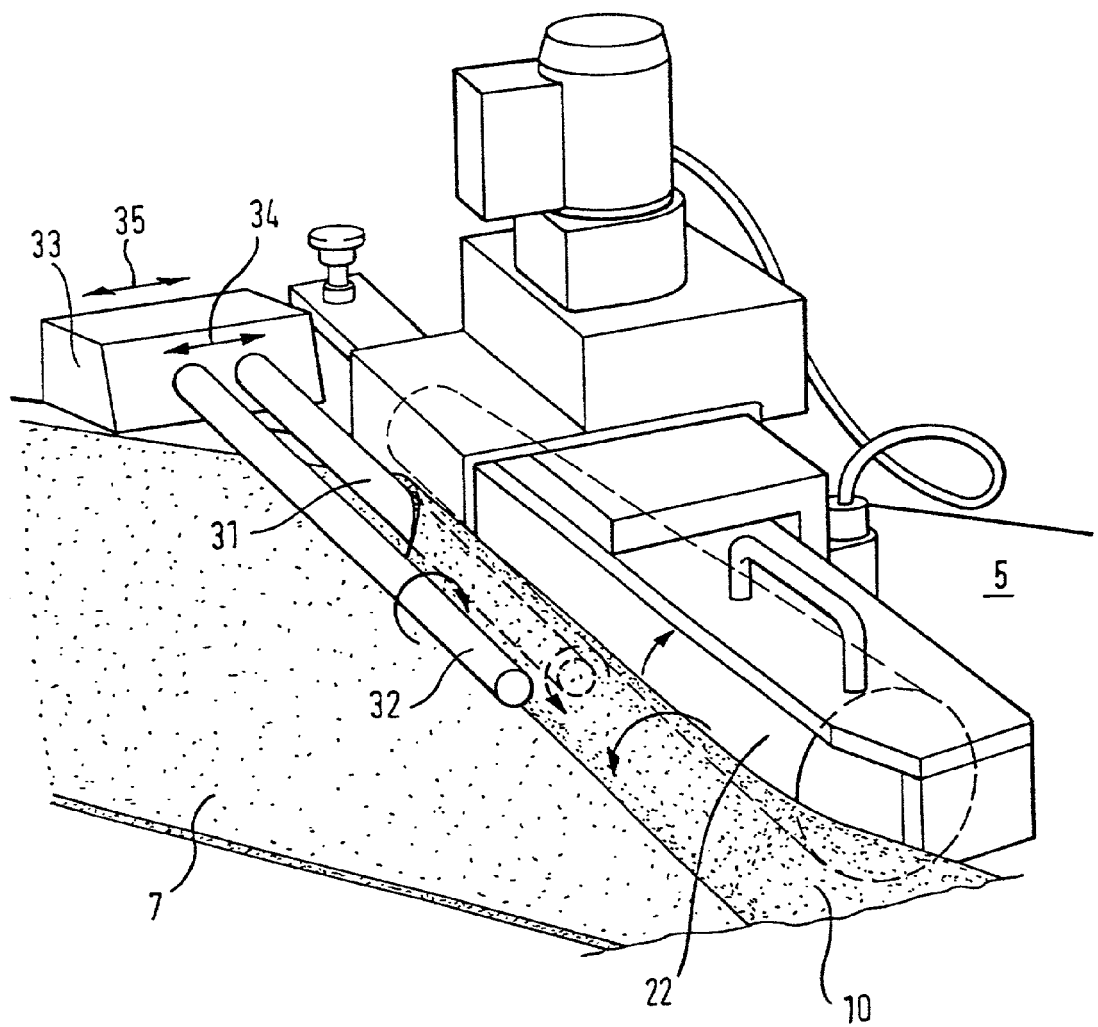
FIG. 8 shows an isometric view of the first embodiment depicted in FIGS. 5 to 7.

FIG. 8 shows in more detail the arrangement of the first and second guide means 20, 30 according to the first embodiment just described. As evident from FIG. 8, it is sufficient to provide the core shaft 31 and the tightening shaft 32 only alongside a portion of the length of the side winder roller 22 to achieve the desired effects.

Now with reference to FIGS. 9 to 12, a second embodiment of the present invention will be described.

Figure 9:
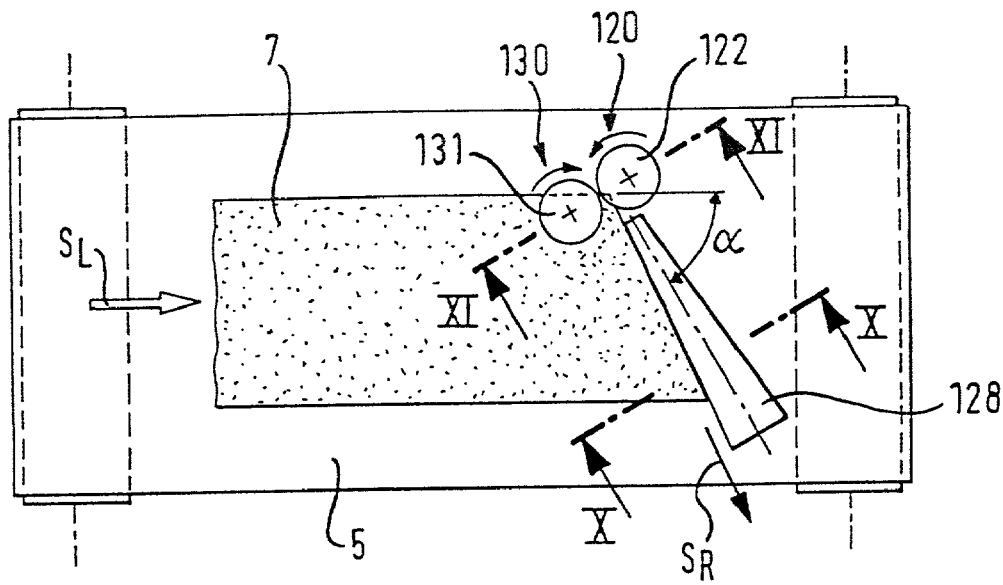
FIG. 9 shows a second embodiment of the present invention in a top view.
Figure 11:
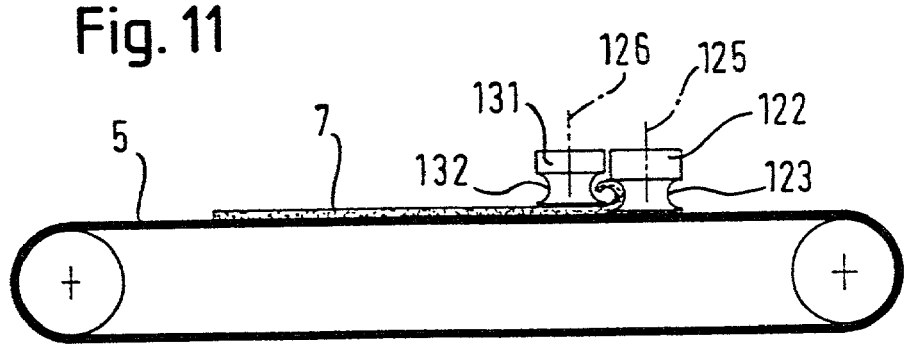
FIG. 11 shows a second cross-sectional view of the second embodiment depicted in FIG. 9 taken along line XI—XI in FIG. 9.

Similar to the first embodiment, a foodstuff strip 7 is supplied on a conveyor belt 5 and along a supply direction $S_L$. The leading edge of the supplied foodstuff strip 7 contacts a deflection roller 122 (FIG. 9). The deflection roller 122 rotates at its side facing the supplied foodstuff strip 7 toward the intended supply direction $S_R$ of the foodstuff roll to be produced. The deflection roller 122 is provided with a recess 123. The recess terminates in a lower edge. The gap between the lower edge of the recess and the conveyor belt 5 is dimensioned to be smaller than the thickness of the provided foodstuff strip 7 (FIG. 11). Preferably, the lower edge of recess 123 will engage the leading edge of the foodstuff strip 7 in the lower portion of the cross-section of the foodstuff strip.

As will be appreciated, due to the recess 123 the deflection roller 122 is a non-cylindrical roller that is mounted around an axis 125. The axis 125 is substantially perpendicular to the plane defined by the supplied foodstuff strip 7.

A similar, preferably identical roller is provided as part of the second guide means. This re-direction roller 131 is mounted around an axis 126 and is provided with a recess 132. In contrast to the deflection roller 122, the re-direction roller 131 is mounted relative to the conveyor belt such that the gap between its lower surface and the conveyor belt 5 is slightly bigger than the thickness of the foodstuff strip 7 to be processed. In this way, the leading edge will pass on the conveyor belt 5 underneath the re-direction roller 131, so as to contact the deflection roller 122. As will be appreciated from FIG. 9, the deflection roller 122 and the re-direction roller 131 are rotated in opposite directions.

Figure 10:
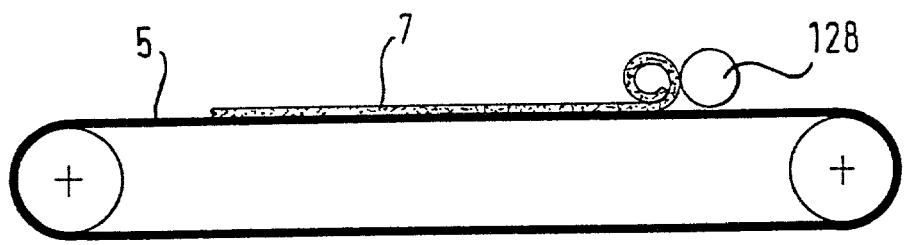
FIG. 10 shows a first cross-sectional view of the second embodiment, taken along line X—X in FIG. 9.

A preferably cone-shaped side of winder roller 128 which is similar to that of the first embodiment depicted in FIGS. 5–8 is indicated in FIGS. 9 and 10 with 128. Typically, the side winder roller 128 will be mounted suspended from a bridge structure spanning the conveyor belt 5.

Operation of the second embodiment is as follows:

The leading edge of the supplied foodstuff strip 7 will contact the deflection roller 122. Upon this contact, the leading edge will proceed into the recess 123 of the deflection roller 122. The recess corresponds in shape to the outer contour of the foodstuff roll that is to be produced, and is preferably the segment of a circle. By following the contour of the recess 123, the foodstuff strip 7 is deflected away from its original supply plane.

If the gap between the deflection roller 122 and the re-direction roller 131 is sufficiently small, the foodstuff strip 7 will despite its inherent restoring forces enter into the corresponding recess 132 of the re-direction roller 131.

Upon contacting this recess 132, the deflected foodstuff strip 7 will be re-directed towards its original supply plane and, therefore, be formed into a roll.

This mechanism is assisted by driving the deflection roller 122 and the re-direction roller 131 in opposite directions. In this way, the re-direction roller 131 will by way of frictional engagement with the foodstuff strip 7 force the produced roll to leave the gap between the deflection roller 122 and the re-direction roller 131 in the intended roll supply direction $S_R$. As in the previous embodiment, varying the rotational velocities can be utilized to precisely control the tightness of the wound roll.

The arrangement of the axis 125 of the deflection roller 122 relative to the axis 126 of the re-direction roller 131, follows from the desired roll supply direction $S_R$ relative to the supply direction $S_L$ of the foodstuff strip 7. In particular, a line drawn between the two axes 125, 126 will be perpendicular to the roll supply direction $S_R$.

The set of rollers provided in the embodiment of FIG. 9 can be supplemented with a second set of rollers, depending on the materials properties of the cheese to be deflected and re-directed (not shown). The second set would preferably have slightly different dimensions, depending on its location as follows. The produced roll of foodstuff will in the area of the foodstuff strip 7 be in the form of a cone.

Figure 12:
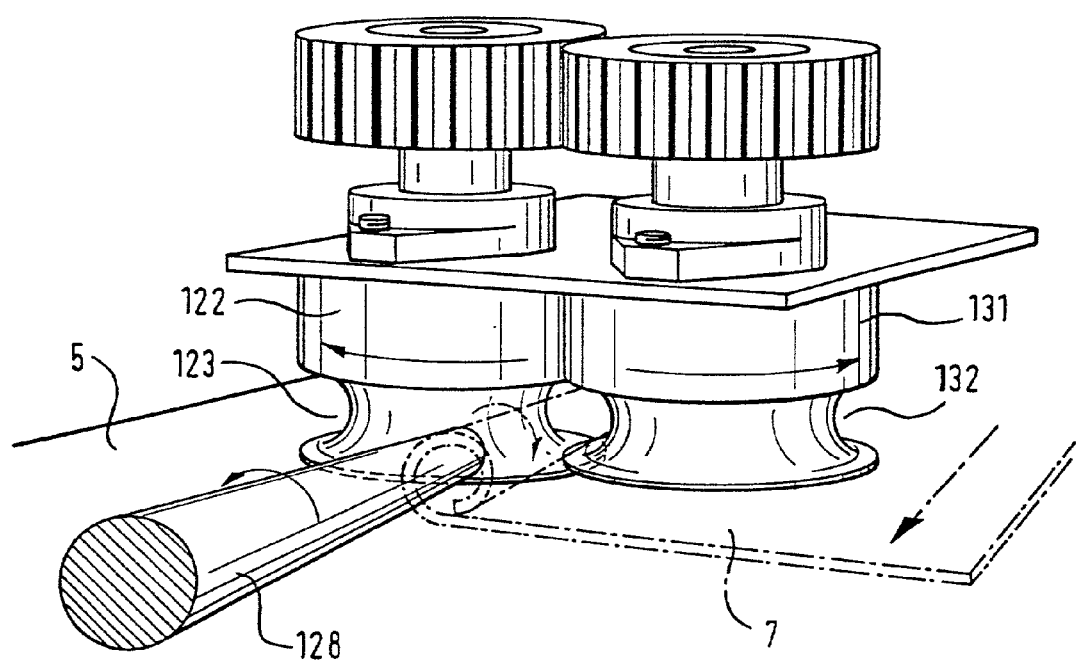
FIG. 12 shows an isometric view of the second embodiment of the present invention depicted in FIG. 9 to 11.
Figure 13:
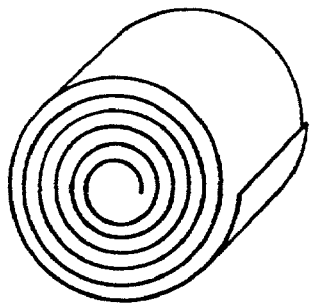
FIG. 13 shows in an isometric view a first embodiment of the inventive product.
Figure 14:
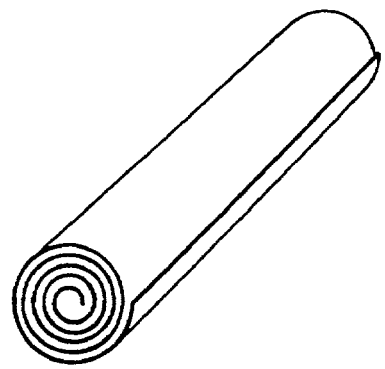
FIG. 14 shows in a view similar to FIG. 13a second embodiment of the inventive products.
Figure 15:
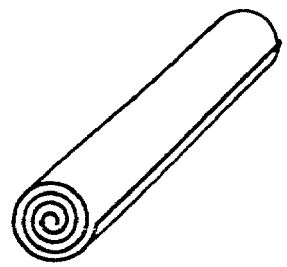
FIG. 15 shows in a view similar to FIGS. 13 and 14 a third embodiment of the inventive product.

Correspondingly, the one of the sets of rollers provided closer to the smaller end of the cone will have dimensions corresponding to the local dimensions of the cone, the other set dimensions corresponding to the larger end of the cone. FIG. 12 shows in a perspective view how the embodiment of FIGS. 9 to 11 operates. In particular, it is evident how the deflection roller 122 is mounted closer to the surface of the conveyor belt 5, and how the re-direction roller 131 is mounted with a larger spacing relative to the surface of the conveyor belt 5. In this manner, the foodstuff strip 7 can pass underneath the re-direction roller 131 and contact the deflection roller 122. It then rolls neatly alongside the surface of the recess 123, passes over into the recess 132 provided on the re-direction roller 131, and is re-directed towards its original supply plane.

From this initial "roll-in", the foodstuff strip 7 is then guided by contact with the side winder roller 128 in a manner similar to that of the first embodiment. It is to be noted that, for the sake of a less complex design, the deflection roller 122 and the re-direction roller 131 are operated at a fixed ratio of rotational velocity. This is achieved by coupling the drive units with meshing gears. As will be apparent to a person having skill in the art, the gear ratio can be selected to achieve the desired velocity relative to the roll of foodstuff to be produced. It is presently preferred to operate the two rollers 122, 131 in a manner so that friction between the recesses 123, 132 and the foodstuff strip 7 is avoided.

Like in the first embodiment, the angle α (FIG. 9) can be modified in order to control the obtained diameter of the foodstuff roll 10. Such a modification can easily be obtained by appropriately mounting at least the deflection roller 122 and the re-direction roller 131 on a pivot arm structure (not shown).

As will further be apparent to a person skilled in the art, the materials selected for hose parts of the disclosed apparatus in contact with the foodstuff should preferably be inert with respect to the foodstuff to be treated. Present alternative solutions embrace a corresponding selection of V2A (stainless steel) for the deflection roller and the re-direction roller as well as the side winder roller of the second embodiment. In the first embodiment, this materials selection would equally apply to the side winder roller, the core shaft and the tightening shaft. Alternatively, these parts maybe manufactured from one or more of the following plastics materials: Polyester, PVC, Polyurethane, Polyolefine, Silicone and the like.

Naturally, it is also possible to select less costly materials and to coat them with one of the above mentioned materials. The surface of these parts maybe smooth or structured, depending on the desired frictional effect.

Turning now to the inventive product, hard cheeses are to be determined in compliance with the German "Käseverordnung" and embrace natural as well as process cheese. A general guideline can be that such cheeses can be cut without substantial plastic deformation. Equivalents are also included in this scope of the invention.

When process cheese is used for the cheese product according to the present invention, the process cheese may contain 30 to 70 wt.-%, preferably 35 to 65 wt.-% and in particular 57 to 62 wt.-% dry matter.

With respect to the dry matter the process cheese for the cheese product according to the invention may contain 0 to 75 wt.-%, preferably 5 to 70 wt.-% and in particular 38 to 45 wt.-% of one or more fat components.

The pH of the process cheese mass may be in the range of 4,5 to 7,0, preferably 5,0 to 6,5 and in particular 5.5 to 5.9.

The protein content may amount to 5 to 40 wt.-%, better 7 to 30 wt.-%, preferably 17 to 25 wt. % and in particular 22 to 25 wt.-% based on the weight of product.

Lactose may be present in an amount of 0 to 15 wt.-%, better 0 to 10 wt.-%, is preferably 1 wt.-% or less and in particular 0,05 to 0,25 wt.-%.

The amount of melting salt, e.g. citrate is preferably in the range from 2 to 4 wt.-%. It is preferable to use as little citrate melting salt or melting salt in general as possible.

A process cheese according to the present invention may contain:
0–98 wt.-% cheese;
0–50 wt.-% butter;
0–40 wt.-% labcasein;
0–5 wt.-% melting salt and
0–10 wt.-% hydrocolloids and/or starch.

In a preferred embodiment the cheese contains:
15–85 wt.-% cheese;
0–40 wt.-% butter;
0–25 wt.-% labcasein;
1–4 wt.-% melting salt and
0–5 wt.-% hydrocolloids and/or starch.

In a particularly preferred embodiment the cheese contains:
70–85 wt.-% cheese;
2–4 wt.-% butter;
2–6 wt.-% labcasein and
2–4 wt.-% citrate.

With respect to product stability, handability and peelability as well as the overall balance of properties the following composition has proved to be very well suited:
75–85 wt.-% cheese;
2.2–2.6 wt.-% butter;
4.5–5.0 wt.-% labcasein and
2.5–3.0 wt.-% melting salt.

In addition to the listed ingredients, all of the above-exemplified compositions may also contain additional ingredients common in the art of making process cheese. The balance is water.

As hydocolloids useful for the present invention, the following may be exemplified: carob flour, guar flour, carrageenan, xanthan, gum arabic, alginates, pectins and cellulose such as carboxy methyl cellulose. Starch or starch derivatives can also be used instead or in addition to the hydrocolloid component.

When using process cheese for the cheese product according to the present invention, then the provided layer may be produced according to methods commonly known for the manufacture of process cheese. In such processes, the starting materials are admixed and melted. The hot viscose melt is then processed into a continuous band of cheese with a preset thickness. This is commonly and suitably done by using an appropriate number of rollers or belts which, at the same time, may effect the cooling of the melt and, thus, the solidification of the processed cheese.

The prepared cheese product according to the present invention may then be packed in a conventional manner, by including 10 or fewer rolls into a single package, better 5 or fewer rolls, and preferably a single roll per package.

The above process according to the present invention can, of course, be modified in many ways, e.g., in order to produce a particular appearance of the cheese product. One particular way of modifying the appearance of the cheese product involves the addition of a colorant, such as carotin, to the process cheese just before or during the cooling operation.

The cheese product according to the present invention can, of course also be provided with different flavours such as pizza, ham, smoked bacon and the like. Herbs can also be admixed to provide for a particular taste and appearance. It is also possible to use more than one type of cheese in a single cheese product according to the invention, whereby the cheese may differ e.g. in its colour and/or flavour.

What is claimed is:

1. Method of producing rolls of a resilient foodstuff, the method comprising the following steps:
   supplying a layer of the resilient foodstuff in a supply plane and against first guide means, and
   continuously deflecting the resilient foodstuff layer by way of the first guide means away from the supply plane, the first guide means being a non-cylindrical deflection roller having an axis arranged substantially perpendicular to the supply plane, continuously re-directing the deflected foodstuff layer by way of second guide means toward the supply plane, so as to produce a roll of foodstuff.

2. Method as claimed in claim 1, wherein the step of supplying is carried out in the supply plane along a supply direction ($S_L$), and the step of deflecting is carried out in an angle ($\alpha$) relative to the supply direction.

3. Method as claimed in claim 2, wherein the diameter of the produced roll of foodstuff is controlled by modifying the angle ($\alpha$) relative to the supply direction ($S_L$).

4. Method as claimed in claim 2, wherein the angle ($\alpha$) relative to the supply direction ($S_L$) is between 30° and 60°.

5. Method as claimed in claim 1, wherein the first guide means is driven so as to frictionally enhance its guiding effect, or the second guide means is driven so as to frictionally enhance its re-directing effect.

6. Method as claimed in claim 5, wherein the first guide means and the second guide means are driven in opposite directions.

7. Method as claimed in claim 5, wherein the velocity of the first or second guide means is used for controlling the tightness of the produced roll of foodstuff.

8. Method as claimed in claim 1, wherein the deflection roller has a generatrix line adjacent and substantially parallel to the supply plane.

9. Method as claimed in claim 5, wherein the second guide means comprises at least one re-direction roller.

10. Method as claimed in claim 9, wherein the deflection roller comprises a cone-shaped deflection roller having an axis, and the re-direction roller comprises a cylindrical re-direction roller having an axis arranged substantially parallel to the axis of the deflection roller.

11. Method as claimed in claim 1, wherein the second guide means comprises a non-cylindrical re-direction roller having an axis arranged substantially perpendicular to the supply plane and substantially parallel to the axis of the deflection roller.

12. Method as claimed in claim 11, further comprising a step of parting the produced roll of foodstuff.

13. Apparatus for producing rolls of a resilient foodstuff, the apparatus comprising:
supply means for supplying a layer of the resilient foodstuff in a supply plane,
first guide means against which the resilient foodstuff layer can be supplied and for continuously deflecting the foodstuff layer away from the supply plane, the first guide means being a non-cylindrical deflection roller having an axis arranged substantially perpendicular to the supply plane, and
second guide means for continuously re-directing the deflected foodstuff layer toward the supply plane, so as to produce a roll of foodstuff.

14. Apparatus as claimed in claim 13, wherein the first guide means is arranged in an angle ($\alpha$) relative to the supply direction ($S_L$), so as to deflect the resilient foodstuff layer in an angle relative to the supply direction ($S_L$).

15. Apparatus as claimed in claim 13, wherein the arrangement angle ($\alpha$) relative to the supply direction is between 30° and 60°.

16. Apparatus as claimed in claim 13, further comprising means for driving the first guide means or the second guide means, so as to frictionally enhance the guiding or re-directing effect thereof.

17. Apparatus as claimed in claim 16, wherein the means for driving is adapted to drive the first guide means and the second guide means in opposite directions.

18. Apparatus as claimed in claim 17, further comprising control means for modifying the velocity of the first or second guide means, so as to control the tightness of the produced roll of foodstuff.

19. Apparatus as claimed in claim 13, wherein the first guide means comprises a deflection roller having a generatrix line adjacent and substantially parallel to the supply plane.

20. Apparatus as claimed in claim 19, wherein the second guide means comprises at least one re-direction roller.

21. Apparatus as claimed in claim 20, wherein the deflection roller comprises a cone-shaped deflection roller having an axis, and the re-direction roller comprises a cylindrical re-direction roller having an axis arranged substantially parallel to the axis of the deflection roller.

22. Apparatus as claimed in claim 13, wherein the second guide means comprises a non-cylindrical re-direction roller having an axis arranged substantially perpendicular to the supply plane and substantially parallel to the axis of the deflection roller.

23. Apparatus as claimed in claim 18, wherein the first and second guide means are mounted so that the distance between the first and second guide means is variable.

24. Apparatus as claimed in claim 22, further comprising means for parting the produced roll of foodstuff.

25. Apparatus as claimed in claim 24, wherein the parting means is arranged adjacent to the supply means.

26. Method as claimed in claim 4, wherein the angle (a) relative to the supply direction ($S_L$) is about 45°.

27. Method as claimed in claim 9, wherein the second guide means comprises a pair of re-direction rollers.

28. Apparatus as claimed in claim 13, wherein the arrangement angle (a) relative to the supply direction is about 45°.

29. Apparatus as claimed in claim 19, wherein the second guide means comprises a pair of re-direction rollers.

30. Method of producing rolls of a resilient foodstuff, the method comprising the following steps:
supplying a layer of the resilient foodstuff in a supply plane,
contacting the leading edge of the supplied resilient foodstuff against a deflection roller,
directing the leading edge of the supplied resilient foodstuff into a recess of the deflection roller to deflect the supplied resilient foodstuff away from the supply plane and toward a redirection roller,
contacting the leading edge of the supplied resilient foodstuff against the redirection roller,
directing the leading edge of the supplied resilient foodstuff into a recess of the redirection roller to deflect the supplied resilient foodstuff toward the supply plane to form a roll, and
rotating the deflection roller and redirection roller in opposite directions about axes generally perpendicular to the supply plane.

31. Method as claimed in claim 30, further comprising the step of guiding the roll in a roll supply direction ($S_L$) having an angle ($\alpha$) relative to the supply direction by urging the roll with a winder roller.

* * * * *

UNITED STATES PATENT AND TRADEMARK OFFICE
CERTIFICATE OF CORRECTION

PATENT NO. : 7,060,314 B2  Page 1 of 1
APPLICATION NO. : 10/125743
DATED : June 13, 2006
INVENTOR(S) : Kaiser It is certified that error appears in the above-identified patent and that said Letters Patent is hereby corrected as shown below:

On Title Page, Item 75, under (Inventor), line 1, delete "Glonn" and insert -- Fischingen -- .

On Title Page, Item 56, under (U.S. Patent Documents), line 1, delete "E mbrey" and insert -- Embrey -- .

On first page, col. 2, under (Abstract), line 16, delete "redirecting", and insert -- re-directing -- .

In col. 12, line 31, claim 26, delete "angle (a)", and insert -- angle ($\alpha$) --.

In col. 12, line 36, claim 28, delete "angle (a)", and insert -- angle ($\alpha$) -- .

In col. 12, line 50, claim 30, delete "redirection", and insert -- re-direction -- .

In col. 12, line 52, claim 30, delete "redirection", and insert -- re-direction -- .

In col. 12, line 54, claim 30, delete "redirection", and insert -- re-direction -- .

In col. 12, line 57, claim 30, delete "redirection", and insert -- re-direction -- .

Signed and Sealed this

Sixth Day of February, 2007

JON W. DUDAS
*Director of the United States Patent and Trademark Office*